United States Patent
Ryu

(10) Patent No.: US 10,952,088 B2
(45) Date of Patent: Mar. 16, 2021

(54) METHOD AND NETWORK DEVICE FOR RECEIVING REPORT, AND METHOD AND BASE STATION FOR PERFORMING REPORT

(71) Applicant: LG Electronics Inc., Seoul (KR)

(72) Inventor: Jinsook Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,694

(22) PCT Filed: Mar. 13, 2018

(86) PCT No.: PCT/KR2018/002931
§ 371 (c)(1),
(2) Date: Dec. 13, 2018

(87) PCT Pub. No.: WO2018/169281
PCT Pub. Date: Sep. 20, 2018

(65) Prior Publication Data
US 2020/0128420 A1    Apr. 23, 2020

Related U.S. Application Data

(60) Provisional application No. 62/470,345, filed on Mar. 13, 2017.

(51) Int. Cl.
*H04W 24/10* (2009.01)
*H04W 76/27* (2018.01)

(52) U.S. Cl.
CPC ........... *H04W 24/10* (2013.01); *H04W 76/27* (2018.02)

(58) Field of Classification Search
CPC ....... H04W 72/04; H04W 76/04; H04W 8/22; H04W 24/10; H04W 36/0088;
(Continued)

(56) References Cited

U.S. PATENT DOCUMENTS 9,497,771 B2 * 11/2016 Vangala .............. H04W 40/005
9,603,176 B2 *  3/2017 Wei ......................... H04W 4/80
(Continued)

FOREIGN PATENT DOCUMENTS

JP          5205093       6/2013
JP      2014-523213       9/2014
(Continued)

OTHER PUBLICATIONS

Ericsson, "RRC Inactive state notification support in TS 23.502," S2-175390, SA WG2 Meeting #122bis, Sofia Antipolis, France, dated Aug. 21-15, 2017, 6 pages, XP051334912.
(Continued)

*Primary Examiner* — Man U Phan
(74) *Attorney, Agent, or Firm* — Fish & Richardson P.C.

(57) ABSTRACT

A network device with an access and mobility management function (AMF) transmits a request message for requesting a base station to perform radio resource control (RRC) state reporting for a user equipment. The base station transmits a reporting message including information indicating whether the user equipment is in an RRC_CONNECTED state or an RRC_INACTIVE state to the network device.

16 Claims, 11 Drawing Sheets

(58) Field of Classification Search
CPC . H04W 4/005; H04W 24/08; H04W 72/0406;
H04W 36/08; H04W 64/04; H04W 48/18;
H04W 8/08; H04W 8/18; H04W 48/16;
H04W 76/27; H04W 80/02; H04W 28/18;
H04W 74/08; H04W 76/00; H04W 68/02;
H04L 29/08; H04L 12/911; H04L 5/00;
H04M 3/42
USPC .................................................. 370/241–252
See application file for complete search history.

(56) References Cited

U.S. PATENT DOCUMENTS

| | | | | |
|---|---|---|---|---|
| 9,668,236 | B2* | 5/2017 | Ryu | H04W 68/00 |
| 9,681,342 | B2* | 6/2017 | Martinez Tarradell | |
| | | | | H04W 24/08 |
| 9,730,090 | B2* | 8/2017 | Johansson | H04W 76/18 |
| 9,814,025 | B2* | 11/2017 | Jung | H04W 8/22 |
| 10,051,682 | B2* | 8/2018 | Vangala | H04L 1/1832 |
| 10,264,622 | B2* | 4/2019 | Park | H04W 92/20 |
| 2014/0146691 | A1* | 5/2014 | Soliman | H04W 24/10 |
| | | | | 370/252 |
| 2015/0237547 | A1 | 8/2015 | Tarradell et al. | |
| 2015/0305056 | A1 | 10/2015 | Vangala et al. | |
| 2015/0319744 | A1 | 11/2015 | Jung et al. | |
| 2016/0112857 | A1 | 4/2016 | Wu et al. | |
| 2016/0234877 | A1 | 8/2016 | Bangolae et al. | |
| 2016/0255668 | A1 | 9/2016 | Wei | |
| 2016/0286385 | A1 | 9/2016 | Ryu et al. | |
| 2018/0270713 | A1* | 9/2018 | Park | H04W 28/18 |
| 2019/0246445 | A1* | 8/2019 | Centonza | H04W 76/27 |
| 2019/0394698 | A1* | 12/2019 | Jeong | H04W 36/30 |

FOREIGN PATENT DOCUMENTS

| | | |
|---|---|---|
| RU | 2578166 | 3/2016 |
| WO | WO 2014084675 | 6/2014 |

OTHER PUBLICATIONS

Extended European Search Report in European Application No. 18768597.9, dated Feb. 14, 2020, 9 pages.
Japanese Office Action in Japanese Application No. 2019-534627, dated Jan. 14, 2020, 5 pages (with English translation).
Qualcomm Incorporated, "P-CR to 23.501 on SA2 impacts of RRC inactive mode and RAN paging," S2-170916, SA WG2 Meeting #119, Dubrovnik, dated Feb. 13-17, 2017, 5 pages.
Qualcomm Incorporated, "RRC inactive mode/ RAN paging—SA2 aspects," S2-170227, SA WG2 Meeting #11 SBIS, Spokane, US, dated Jan. 16-20, 2017, 5 pages, XP051216416.
Vodafone, "Reachability procedure," S2-170661, SA WG2 Meeting #118-BIS, Spokane, WA, USA, dated Jan. 16-20, 2017, 3 pages, XP051227926.
3rd Generation Partnership Project, "Technical Specification Group Radio Access Network; Study on New Radio Access Technology; Radio Interface Protocol Aspects," 3GPP TR 38.804, 2017, Release 14, 56 pages.
Kim et al., "Mobility Management Technology for 5G," OSIA S&TR Journal, 2016, 29(4): 23 pages.
NTT Docomo, Inc., "Text Proposal to TR 38.804 on UE states and state transitions for NR," 3GPP TSG-RAN WG2 #96, dated Nov. 14-18, 2016, 4 pages.
Kim, "Trends of 3GPP Technology for 5G Network," OSIA S&TR Journal, 2016, 29(4): 17 pages.
Notice of Allowance in Korean Application No. 10-2018-0029225, dated Jun. 19, 2018, 3 pages (with English Translation).
3GPP TR 38.803 V1.0.0 (Dec. 2016); 3rd Generation Partnership Project; Technical Specification Group Radio Access Study Network; Study on New Radio Access Technology; RF and co-existence aspects (Release 14), 48 pages.
3GPP TS 23.501 V0.3.1 (Mar. 2017); 3rd Generation Partnership Project; Technical Specification Group Services and System Aspects; System Architecture for the 5G System; Stage 2 (Release 15), 97 pages.
3GPP TS 23.502 V0.2.0 (Feb. 2017); 3rd Generation Partnership Project; Technical Specification Group Services and System Aspects; Procedures for the 5G System; Stage 2 (Release 15), 71 pages.
3GPP TR 23.799 V14.0.0 (Dec. 2016); 3rd Generation Partnership Project; Technical Specification Group Services and System Aspects; Study on Architecture for Next Generation System (Release 14), 522 pages.
Japanese Office Action in Japanese Appln. No. 2019-534627, dated Jun. 23, 2020, 6 pages (with English translation).
Russian Notice of Allowance in Russian Appln. No. 2019127671, dated Apr. 24, 2020, 21 pages (with English translation).

* cited by examiner (a) UE-P-GW user plane with E-UTRAN (b) Control Plane UE-MME

METHOD AND NETWORK DEVICE FOR RECEIVING REPORT, AND METHOD AND BASE STATION FOR PERFORMING REPORT

CROSS-REFERENCE TO RELATED APPLICATIONS

This application is a National Stage application under 35 U.S.C. § 371 of International Application No. PCT/KR2018/002931, filed on Mar. 13, 2018, which claims the benefit of U.S. Provisional Application No. 62/470,345, filed on Mar. 13, 2017. The disclosures of the prior applications are incorporated by reference in their entirety.

TECHNICAL FIELD

The present invention relates to a wireless communication system and, more particularly, to a method of receiving/performing reporting on a user equipment and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication. Further, a communication system to be designed in consideration of a service/UE sensitive to reliability and standby time is under discussion.

Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

Further, with development of technology, reduction in delay or latency is emerging as an important issue. Applications, performance of which remarkably depends on delay/latency, has been increasing. Therefore, a method of further reducing delay/latency as compared with a legacy system is needed.

As smart devices are developed, a new method of efficiently transmitting/receiving few data or efficiently transmitting/receiving less frequently generated data is also needed.

In addition, a method of efficiently transmitting/receiving signals in a system supporting new radio access technology is demanded.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of receiving reporting on a user equipment by a network device with an access and mobility management function (AMF). The method comprises: transmitting a request message for requesting a base station to perform radio resource control (RRC) state reporting for the user equipment; and receiving a reporting message including information indicating whether the user equipment is in an RRC_CONNECTED state or an RRC_INACTIVE state from the base station.

According to another aspect of the present invention, provided herein is a method of performing reporting on a user equipment by a base station to a network device with an access and mobility management function (AMF). The method comprises: receiving a request message for requesting the base station to perform radio resource control (RRC) state reporting for the user equipment; and transmitting a reporting message including information indicating whether the user equipment is in an RRC_CONNECTED state or an RRC_INACTIVE state to the network device.

According to another aspect of the present invention, provided herein is a network device with an access and mobility management function (AMF) for receiving reporting on a user equipment. The network device includes a transmitting/receiving module, and a processor configured to control the transmitting/receiving module. The processor is configured to: control the transmitting/receiving module to transmit a request message for requesting a base station to perform radio resource control (RRC) state reporting for the user equipment; and control the transmitting/receiving module to receive a reporting message including information indicating whether the user equipment is in an RRC_CONNECTED state or an RRC_INACTIVE state from the base station.

According to another aspect of the present invention, provided herein is a base station for performing reporting on a user equipment to a network device with an access and mobility management function (AMF). The base station includes a transmitting/receiving module, and a processor configured to control the transmitting/receiving module. The processor is configured to: control the transmitting/receiving module to receive a request message for requesting the base station to perform radio resource control (RRC) state reporting for the user equipment; and control the transmitting/receiving module to transmit a reporting message including information indicating whether the user equipment is in an RRC_CONNECTED state or an RRC_INACTIVE state to the network device.

In each aspect of the present invention, the request message may be transmitted when the user equipment is in a CM_CONNECTED state.

In each aspect of the present invention, the request message may include information indicating whether the base station should perform the RRC state reporting whenever an RRC state of the user equipment is changed.

In each aspect of the present invention, the reporting message may include an identifier of a tracking area to which the user equipment belongs and an identifier of a cell to which the user equipment belongs.

In each aspect of the present invention, the network device may transmit a request message for requesting the base station to stop the RRC state reporting for the user equipment to the base station.

In each aspect of the present invention, the base station may receive a request message for requesting the base station to stop the RRC state reporting for the user equipment from the network device.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an embodiment of the present invention, delay/latency generated in a process of communicating between a UE and a BS can be reduced.

As smart devices are developed, few data can be efficiently transmitted/received or less frequently generated data can be efficiently transmitted/received.

In addition, signals can be efficiently transmitted/received in a system supporting new radio access technology.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
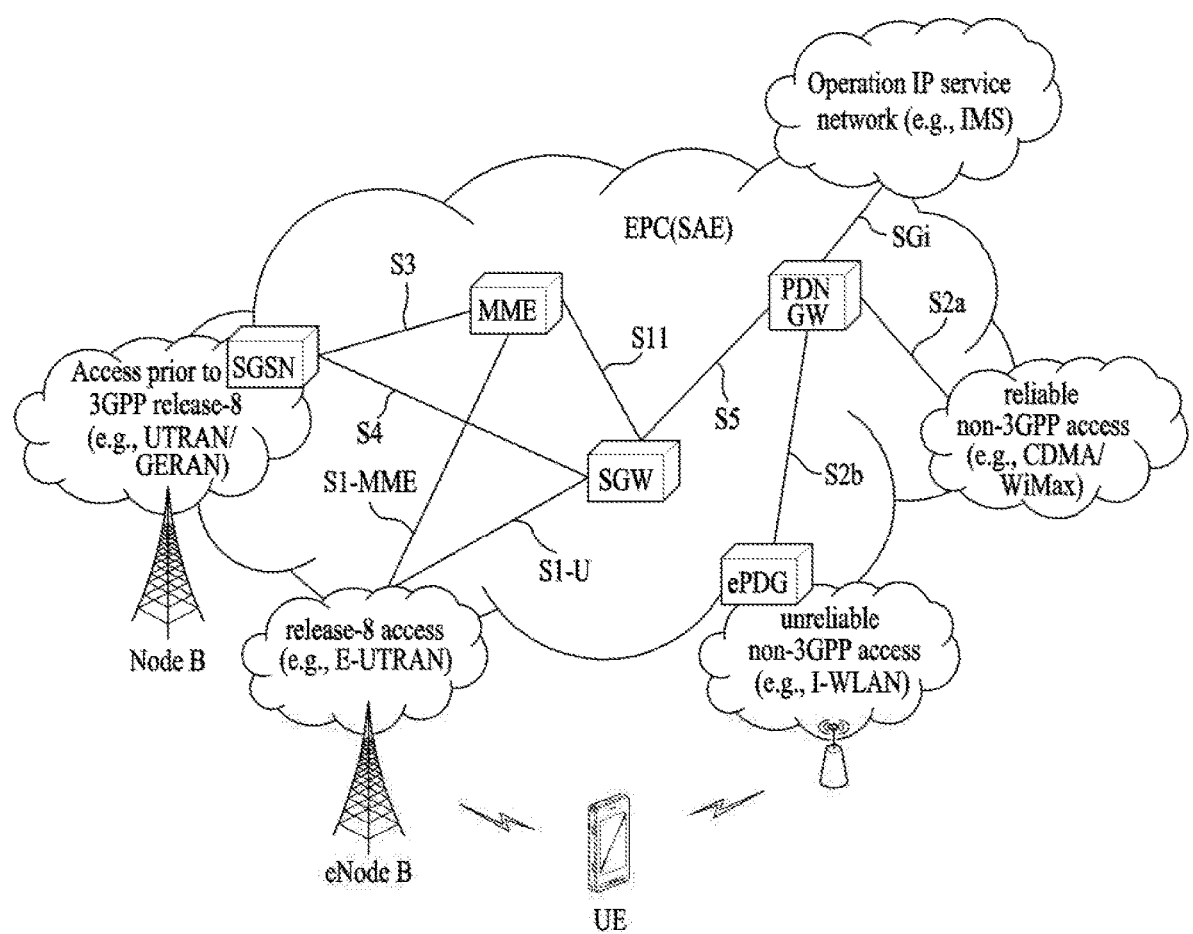
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution or New Radio (3GPP LTE/NR) system, and a 3GPP2 system. That is, steps or parts that are not described to clarify the technical features of the present invention may be explained with reference to the above standard specifications.

All terms disclosed in this document may be explained by the above standard specifications. For example, this disclosure may be supported by one or more of 3GPP LTE standard specifications of 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, and 3GPP TS 24.301 and/or 3GPP NR standard specifications (e.g., 3GPP TS 38.331 and 3GPP TS 23.501).

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a PDN GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS (Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

gNB: A node which provides NR user plane and control plane protocol terminations towards the UE and is connected to a 5G core network (5GC) through a next generation (NG) interface (e.g., NG-C or NG-U).

5G access network: An access network including an NG-RAN and/or a non-3GPP AN connecting to a 5G core network.

5G system: A 3GPP system consisting of a 5G access network (AN), a 5G core network, and a UE. The 5G system may also be called a new radio (NR) system or an NG system.

NGAP UE association: A logical per-UE association between a 5G-AN node and an access and mobility management function (AMF).

NF service: A functionality exposed by a network function (NF) through a service based interface and consumed by other authorized NFs.

NG-RAN: A wireless access network of a 5G system.

NG-C: A control plane interface between an NG-RAN and a 5GC.

NG-U: A user plane interface between an NG-RAN and a 5GC.

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
|---|---|
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
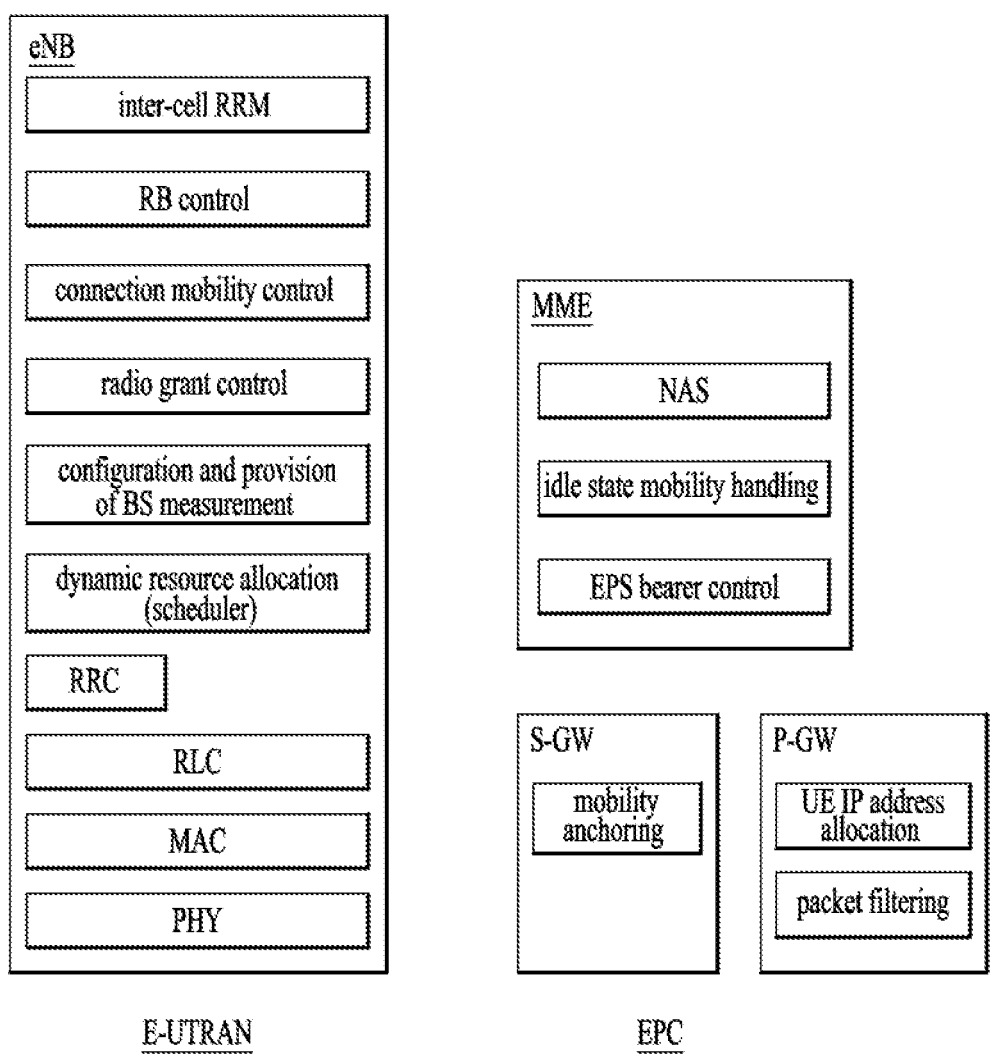
FIG. 2 is a diagram exemplarily illustrating architectures of a general E-UTRAN and EPC.

FIG. 2 is a diagram exemplarily illustrating architectures of a typical E-UTRAN and EPC. As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
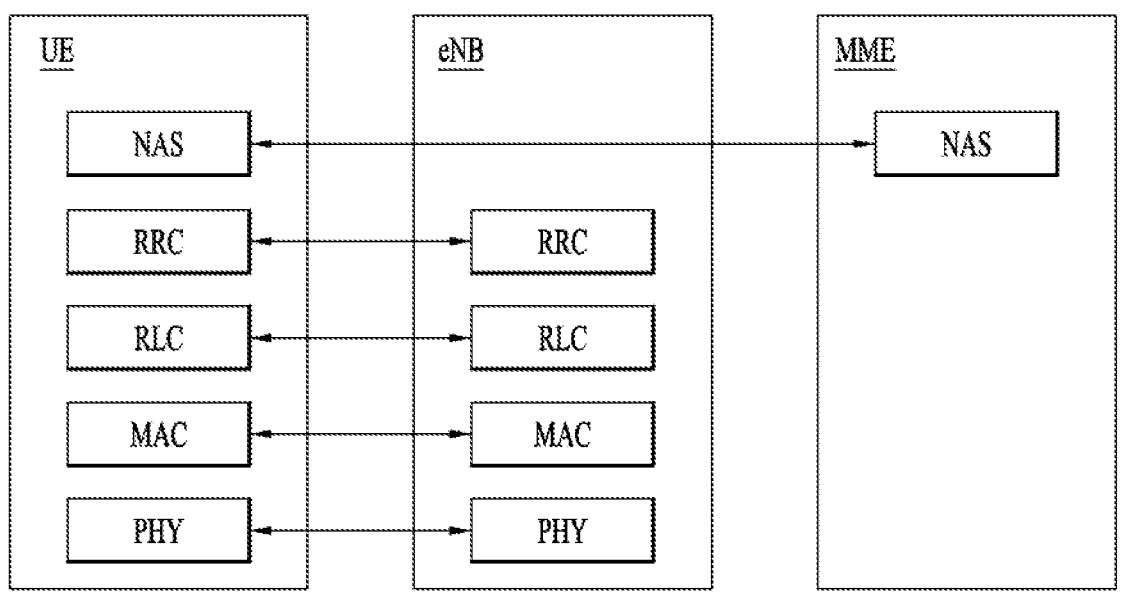
FIG. 3 is a diagram exemplarily illustrating the structure of a radio interface protocol in a control plane.
Figure 4:
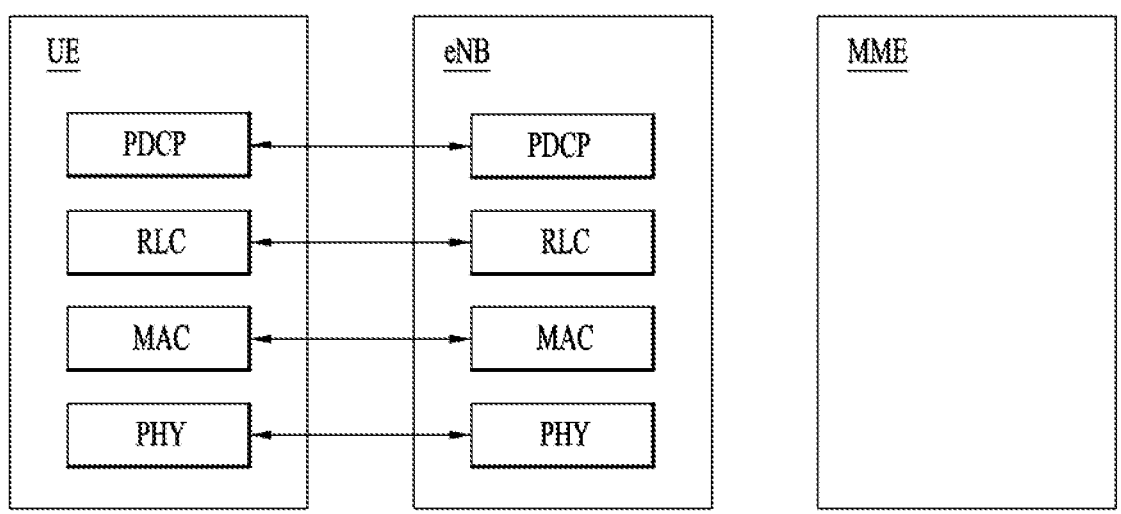
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
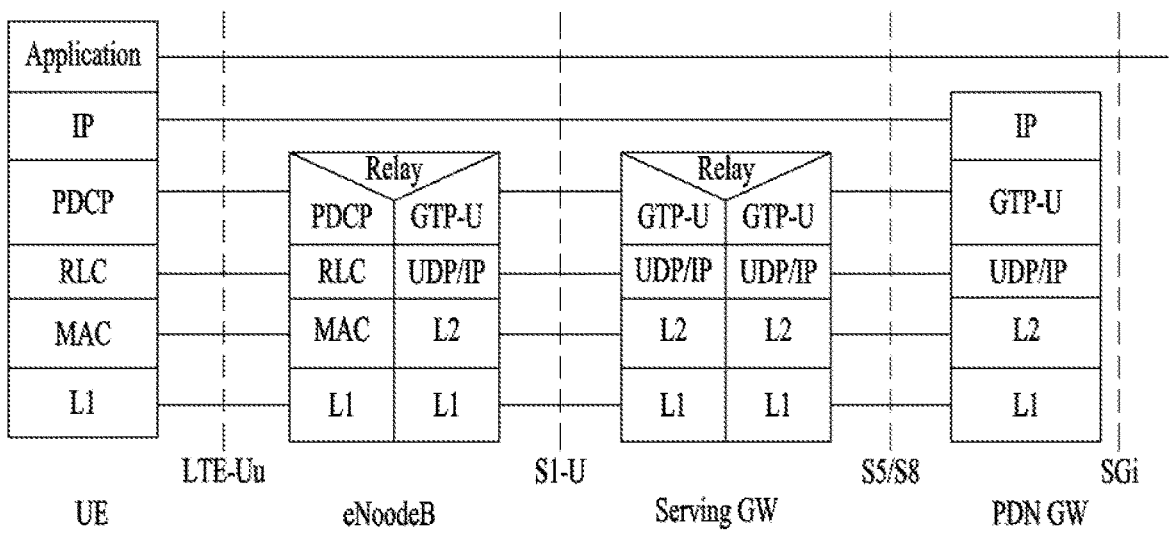
FIG. 5 is a diagram illustrating LTE (Long Term Evolution) protocol stacks for a user plane and a control plane.
Figure 5:
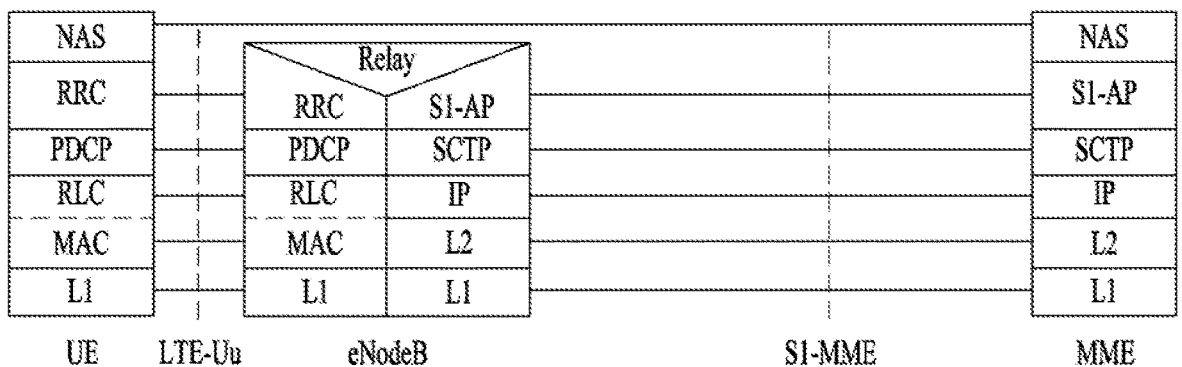

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
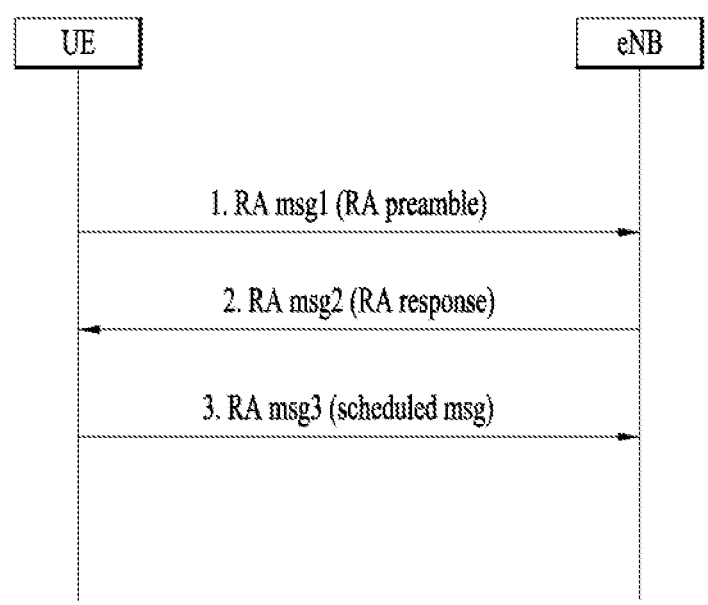
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.
2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).
3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
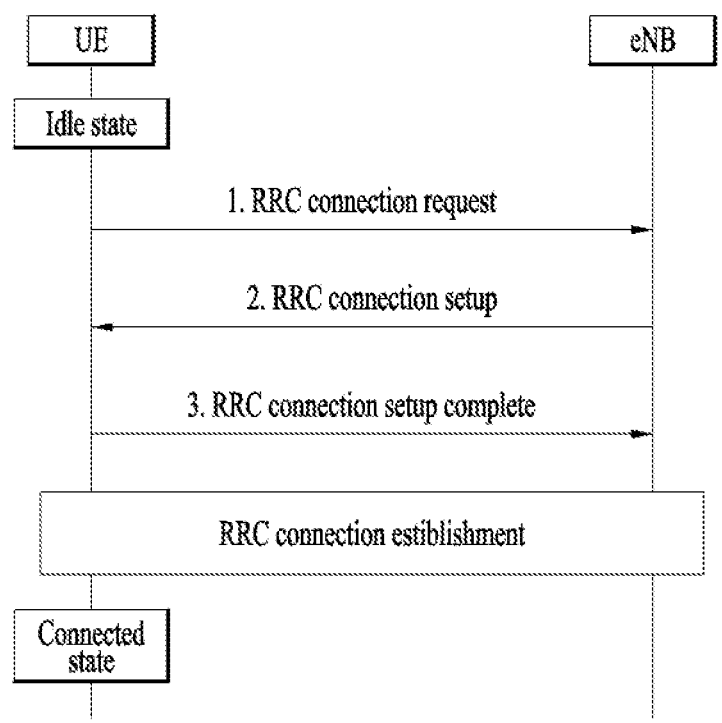
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in RRC_IDLE. Only when the UE staying in the idle state needs to establish RRC connection, does the UE establish RRC connection with the RRC layer of the eNB through the RRC connection procedure and then transition to the RRC_CONNECTED state.

The UE staying in RRC_IDLE needs to establish RRC connection in many cases. For example, the cases may include an attempt of a user to make a phone call, an attempt to transmit data, or transmission of a response message after reception of a paging message from the E-UTRAN.

In order for the UE in RRC_IDLE to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB.

1. When the UE in RRC_IDLE desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC_CONNECTED mode.

In current 3GPP, a study on a next-generation mobile communication system after EPC is underway. For design of the next-generation mobile network system, for example, a 5G core network, 3GPP has defined service requirements through the study called services and markets technology enablers (SMARTER). System architecture 2 (SA2) is conducting Study on Architecture for Next Generation System, FS_NextGen, based on the SMARTER. The following terminologies are defined for the next-generation (NextGen) system (NGS) in 3GPP TR 23.799.

Evolved E-UTRA: A RAT representing the evolution of an E-UTRA radio interface for operation in a NextGen system.

Network Capability: A network-provided and 3GPP-specified feature that typically is not used as a separate standalone "end user service", but rather as a component that may be combined into a telecommunication service that is offered to an "end user". For example, a location service is typically not used by an "end user" to simply query the location of another UE. As a feature or network capability, the location service may be used, for example, by a tracking application, which is then offered as the "end user service". The network capability may be used by a network internally and may be exposed to external users, that are also denoted third parties.

Network Function: A network function in TR 23.700 is a 3GPP adopted or 3GPP defined processing function in a network, which has a functional behavior or 3GPP defined interface. Note 3: A network function can be implemented as a network element on dedicated hardware, as a software instance running on dedicated hardware, or as a virtualized function instantiated on an appropriate platform (e.g., on cloud infrastructure).

NextGen Core Network: A core network specified in the present document, that connects to a NextGen access network.

NextGen RAN (NG RAN): A radio access network that supports one or more of the following operations:

Standalone new radio,

Standalone new radio is an anchor with evolved E-UTRA extensions,

Evolved E-UTRA,

Evolved E-UTRA is an anchor with evolved new radio extensions.

NG RAN has common characteristics in that a RAN interfaces with a NextGen core.

NextGen Access Network (NG AN): A NextGen RAN or a non-3GPP access network which interfaces with a NextGen core.

NextGen (NG) System: A NextGen system including an NG AN and a NextGen core.

NextGen UE: A UE connecting to a NextGen system.

PDU Connectivity Service: A service that provides exchange of PDUs between a UE and a data network.

PDU Session: Association between a data network that provides a PDU connectivity service and a UE. The type of the association includes an IP type, an Ethernet type, and a non-IP type. In other words, while a legacy session has been of the IP type, a NextGen session may be distinguished even depending on whether session type is of the Ethernet type or the non-IP type.

PDU Session of IP Type: Association between a UE and an IP data network.

Service Continuity: Uninterrupted user experience of a service including the cases in which an IP address and/or an anchoring point changes.

Session Continuity:

The continuity of a PDU session. For a PDU session of an IP type, "session continuity" implies that an UP address is preserved for the lifetime of the PDU session.

A 5G system architecture is defined to support data connectivity and services enabling deployments to use techniques such as network function virtualization and software defined networking. The 5G system architecture is defined as service-based and the interaction between network functions is represented in two ways:

A service-based representation, where network functions (e.g., AMF) within the control plane enables other authorized network functions to access their services.

A reference point representation. This shows the interaction existing between NF services in the network functions described by point-to-point reference point (e.g., N11) between any two network functions (e.g., AMF and SMF).

The 5G system architecture consists of various network functions (NFs). The NFs constituting the 5G system architecture include, for example, an access and mobility management function (MF), a data network (DN), a policy control function (PCF), a session management function (SMF), unified data management (UDM), a user plane function (UPF), a user equipment (UE), and a (radio) access network ((R)AN). Among the NFs of the 5G system, the AMF includes, for example, the following functionality: termination of an RAN control plane (CP) interface (N2), termination of a NAS (N1), NAS ciphering and integrity protection, connection management, reachability management, mobility management, providing transport for SM messages between a UE and an SMF, EPS bearer ID allocation for interworking with an EPS, and the like. The 5G architecture includes various reference points. Thereamong, N1 is a reference point between a UE and an AMF and N2 is a reference point between an (R)AN and an AMF.

For definition of terminologies related to the 5G system architecture and a more detailed description thereof, refer to 3GPP TR 21.905 and 3GPP TS 23.501.

In a legacy LTE system, when a UE is in an RRC_IDLE state over an access network, a UE is in an ECM_IDLE state over a core network when the UE is in an RRC_IDLE state over an access network and the UE is in an ECM_CONNECTED state in the core network when the UE is in an RRC_CONNECTED state over the access network. In other words, in the legacy LTE system, the UE in RRC_IDLE is a UE in ECM_IDLE and the RRC_CONNECTED UE is a UE in ECM_CONNECTED. In the case of a UE in IDLE, all S1 bearers (in S1-U) for the UE and logical S1-application protocol (S1-AP) signaling connection (over an S1-MME) may not be present. In the case of the UE in IDLE, in terms of a network, S1 signaling and RRC connection with the UE have not been established or have been released in a control plane, and a downlink S1 bearer and a data radio bearer (DRB) with the UE have not been established or have been released in a user plane. In terms of the UE_IDLE, an IDLE state may mean that RRC connection and the DRB of a UE are not present in each of the control plane and the user plane. For example, when connection is released once through a connection release procedure, ECM connection between the UE and the MME may be released and all contexts associated with the UE may be deleted in an eNB. Then, the UE may be transitioned to an ECM_IDLE state from an ECM_CONNECTED in the UE and the MME and may be transitioned to an ECM_IDLE from an RRC_CONNECTED state in the UE and the eNB. Accordingly, connection control with the UE needs to be always performed by a core network and paging for the UE needs to be initiated and managed by the core network. Thus, traffic transfer between the UE and the network may be delayed. When a UE in RRC_IDLE intends to transmit traffic or a network intends to transmit traffic to the UE in RRC_IDLE, the UE may be transitioned to RRC_CONNECTED through a service request procedure and, the service request procedure includes exchange of various messages. Accordingly, traffic transport between the UE and the network may be delayed.

To reduce delay during a transition procedure between RRC_IDLE and RRC_CONNECTED, research has been conducted to introduce an RRC_INACTIVE state to an LTE-A system and to support an RRC_INACTIVE state in a 5G system. For example, an RRC layer of the 5G system may support three states having the following characteristics (refer to 3GPP TR 38.804 V0.7.0).

RRC_IDLE
Cell re-selection mobility;
Paging for mobile terminated data is initiated by a core network (e.g., 5GC);
Paging area is managed by core network (CN).
RRC_INACTIVE:
Cell re-selection mobility;
CN-NR RAN connection (both control and user planes) has been established for UE;
The UE access stratum (AS) context is stored in at least one gNB and the UE UE access stratum (AS);
Paging is initiated by NR RAN;
RAN-based notification area is managed by NR RAN;
NR RAN knows the RAN-based notification area which the UE belongs to;
RRC_CONNECTED:
The UE has an NR RRC connection;
The UE has an AS context in NR;
NR RAN knows the cell which the UE belongs to;
Transfer of unicast data to/from the UE;
Network controlled mobility, i.e. handover within NR and to/from E-UTRAN.

Figure 8:
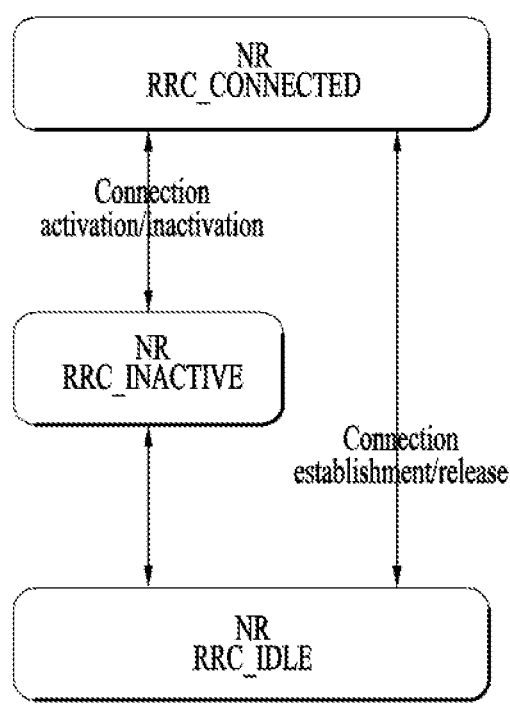
FIG. 8 illustrates UE state transitions. The UE has only one RRC state at a time.

FIG. 8 illustrates UE state transitions. A UE has only one RRC state at one time.

Referring to FIG. 8, the following state transitions are supported between the aforementioned RRC states: from RRC_IDLE to RRC_CONNECTED, following the "connection setup" procedure (e.g. request, setup, complete); from RRC_CONNECTED to RRC_IDLE, following (at least) the "connection release" procedure; from RRC_CONNECTED to RRC_INACTIVE, following the "connection inactivation" procedure; from RRC_INACTIVE to RRC_CONNECTED, following the "connection activation" procedure.

A UE in the RRC_INACTIVE state can be configured with the RAN-based notification area, whereupon: a notification area can cover a single or multiple cells, and can be smaller than CN area; a UE does not send any "location update" indication when it stays within the boundaries of the notification area; leaving the area, a UE updates its location to the network.

In the case of 4G communication, to register a UE to an EPS/LTE system and to maintain the registration state, the UE may perform an attachment procedure and a tracking area update (TAU) procedure (refer to 3GPP TS 23.401). In a 5G system, a registration procedure (refer to 3GPP TS 23.502) formed by combining a legacy attachment procedure and a TAU procedure may be performed. In the 5G system, registration management (RM) may be used to register or deregister a UE/user to a network and may establish a user context to the network. Two RM states of RM_DEREGISTERED and RM_REGISTERED may be used in the UE and the AMF and may reflect the registration state of the UE in the selected PLMN. Connection management (CM) may be used to establish or release signaling connection between the UE and the AMF. The CM may have functions of establishing and releasing signaling between the UE and the AMF over N1. The signaling connection may be used to enable NAS exchange between a UE and a core network and may include AN signaling connection between the UE and the AN (e.g., RRC connection over 3GPP access) and N2 connection for the UE between the AN and the AMF. To reflect NAS signaling connectivity of the UE with the AMF, two connection management (CM) states may be used: CM_IDLE and CM_CONNECTED. The CM_IDLE may be a state that is similar to or corresponds to ECM_IDLE of an LTE (i.e., 4G) system. The CM_CONNECTED may be a state that is similar to or corresponds to the ECM_CONNECTED of a legacy LTE system. A UE in CM_IDLE has no NAS signaling connection established with the AMF over N1 and there are no AN signaling connection, N2 connection, and N3 connection for the UE in CM_IDLE. The AMF may enter a CM_CONNECTED state with respect to the UE whenever N2 connection for the UE between the AN and the AMF is released. The UE in CM_CONNECTED may have a NAS signaling connection with the AMF over N1. The NAS signaling connection may use an RRC connection between the UE and the NG-RAN and may use an NGAP UE association between the AN and the AMF for 3GPP access. The UE in CM_CONNECTED may always enter a CM_IDLE state whenever the AN signaling connection is released. When a UE CM state in the AMF is CM_CONNECTED, a UE in ECM_CONNECTED is a UE in RRC_CONNECTED in the case of an LTE system with a version in which the AMF does not support RRC_INACTIVE but the UE in CM_CONNECTED may be a UE in RRC_CONNECTED or a UE in RRC_INACTIVE.

In terms of a core network, the UE in RRC_INACTIVE is similar to in the case in which the UE is in RRC_CONNECTED and, thus, data and signaling received by the core network are transferred directly to a RAN (e.g., gNB) from the core network but, to transfer the data/signaling to the UE by the RAN between the UE and the RAN, a produce in which the UE is awaken through a paging procedure and a connection between the UE and the RAN is re-established may be required.

For a UE in RRC_IDLE, since an N2 connection, which is a connection between the RAN/gNB for the UE and the AMF (corresponding to an MME in a legacy system), and an RRC connection between the UE and the gNB have been released and the UE is recognized as CM_IDLE even by the CN, an associated operation (e.g., a paging procedure for a mobile terminated service, a tracking area update for checking UE reachability, or a periodic registration procedure) may be performed. For a UE in RRC_CONNECTED, both the N2 connection and the RRC connection for the UE exist and the core network may consider that the UE is immediately reachable and that the UE can respond to a service. However, for a UE in RRC_INACTIVE, although the N2 connection to the UE exists but the RRC connection is in a state similar to the RRC_IDLE state in which the RRC connection does not exist. The UE should wake up during a discontinuous reception (DRX) duration to attempt to receive a paging message and, upon receiving the paging message indicating that there is terminated data for the UE, the UE should establish the RRC connection. In addition, a RAN area which is conceptually similar to a legacy tracking area is configured for the UE by the gNB. If the UE exits from the RAN area while the UE remains in the RRC_INACTIVE state, a RAN area update procedure or a RAN area notification procedure is performed to inform the RAN/gNB that the location of the UE has moved and to perform a periodic RAN area update procedure for periodically updating UE reachability. Thus, the gNB manages mobility of the UE as well as reachability of the UE in RRC_INACTIVE. Although the CN may discern up to a cell to which the UE belongs with respect to the UE in RRC_CONNECTED, the CN discerns only up to a RAN-based notification area with respect to the UE in RRC_INACTIVE. Therefore, from the viewpoint of the CN, it may be appreciated that accuracy of reachability and communication possibility of the UE in RRC_INACTIVE is lower than that of the UE in RRC_CONNECTED. If DRX of a long period or cycle is applied when the UE is in the RRC_INACTIVE state, performance of an end-to-end service may be degraded due to uncertainty about whether the UE is capable of receiving a paging and possibility that the UE exists out of coverage (or in a shadow region). If a DRX period for the UE in RRC_INACTIVE increases, a response of the UE to a mobile-terminated signaling/data that the CN has transmitted to the UE may be delayed. Therefore, although the UE in RRC_INACTIVE is recognized as the UE in RRC_CONNECTED by the CN, performance degradation caused by latency of a response by the UE to a terminated service is predicated.

In consideration of these problems, the present invention proposes an operation method of the CN for the UE in RRC_INACTIVE in which an RRC connection between the UE and an access network (e.g., eNB or gNB) does not exist and a connection between the access network and the CN exists in a cellular/wireless communication system. Particularly, the present invention proposes introducing an RRC state transition reporting procedure so that the CN may recognize an RRC state of the RAN. Hereinafter, the RRC state (transition) reporting procedure according to the present invention will be described.

Through the RRC state (transition) reporting procedure according to the present invention, the AMF may properly recognize RRC state transition. If the AMF requires a service irrelevant to an RRC state (e.g., when a service can be provided regardless of latency of the UE and an accurate location of the UE), the RRC state need not be accurately recognized. However, if a service related to the RRC state is needed, the AMF may recognize the RRC state of the UE through RRC state reporting of the UE. The RRC state (transition) reporting may be performed whenever the RRC state is changed. However, if the (R)AN node (e.g., eNB or gNB) reports the state to the AMF whenever the RRC state of the UE is changed, N2 signaling between the (R)AN and the AMF/MME increases. Therefore, the RRC state (transition) reporting of the present invention may be limited to be performed only when necessary.

Figure 9:
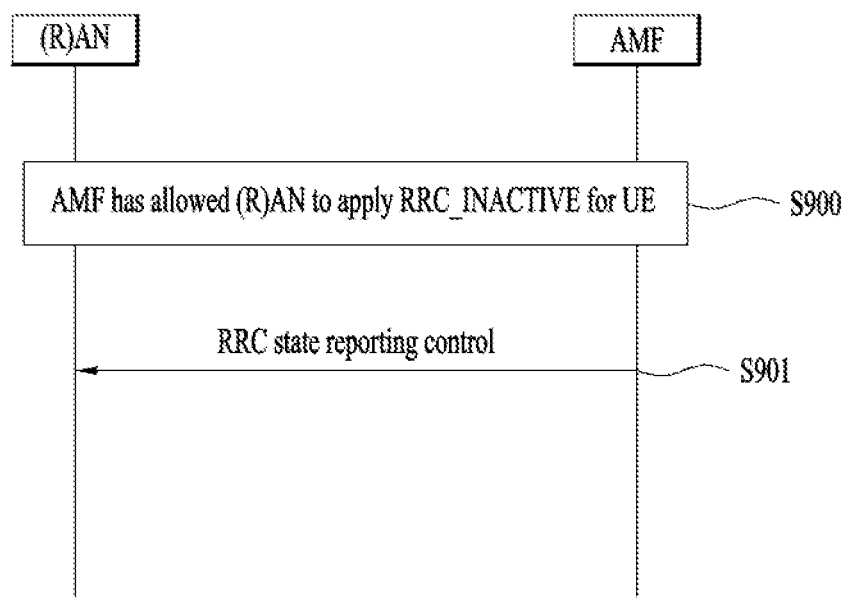
FIGS. 9 and 10 illustrate an RRC state reporting (control) procedure according to the present invention.
Figure 10:
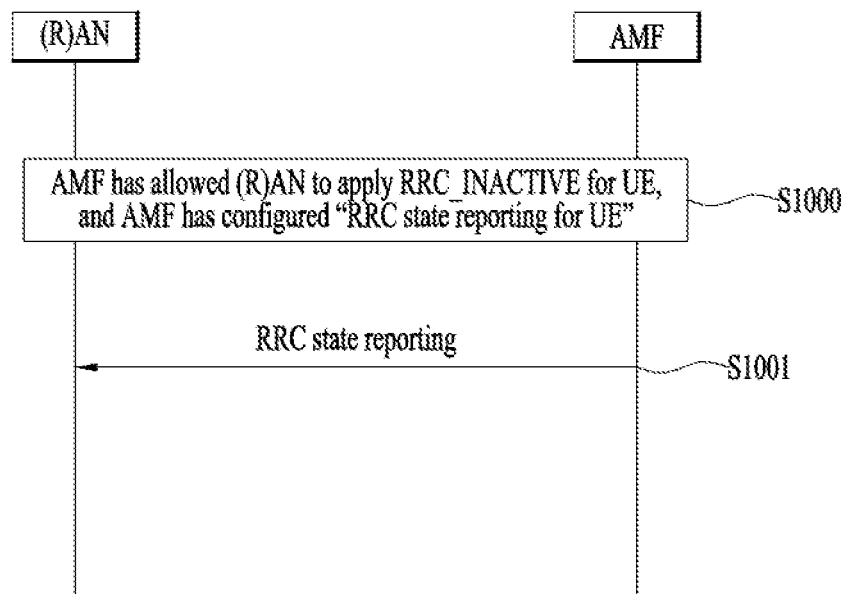

FIGS. 9 and 10 illustrate an RRC state reporting (control) procedure according to the present invention.

In the present invention, the RRC state transition reporting procedure is based on the case in which the AMF allows the (R)AN to apply an RRC_INACTIVE state to a (specific) UE (S900 and S1000). Upon establishing a connection with the (R)AN, the AMF may inform the (R)AN whether the (R)AN can apply the RRC_INACTIVE state to the (specific) UE and the (R)AN which is allowed to apply the RRC_INACTIVE state may transition the UE from an RRC_IDLE/RRC_CONNECTED state to the RRC_INACTIVE state or from the RRC_INACTIVE state to the RRC_IDLE/RRC_CONNECTED state. The (R)AN which is not allowed to apply the RRC_INACTIVE state may transition the UE from the RRC_IDLE state only to the RRC_CONNECTED state or from the RRC_CONNECTED state only to the RRC_IDLE state.

Referring to FIG. 9, when a mobility management (MM) state of the UE is in a CM_CONNECTED state, the AMF may transmit an RRC state reporting control message to the (R)AN node (e.g., eNB or gNB) in order to command the (R)AN node to report RRC state (transition) of the UE (S901). The RRC state reporting control message may include a request type information element (IE) indicating which type of reporting the (R)AN should perform. The RRC state reporting control message may include request information together with the request type IE. The request type IE may indicate whether to directly perform reporting to the (R)AN. Alternatively, the request type IE may indicate, to the (R)AN, whether to perform reporting when an RRC state is changed. Alternatively, the request type IE may indicate whether to stop reporting change of the RRC state to the (R)AN. If the request type is not set to indicate whether to directly perform reporting, the RRC state reporting control message may include information about a request period or a reporting period. The information about the request or reporting period may include: one time; continuous; or period (time). If the request or reporting period information indicates "one time", this may indicate that the (R)AN should perform reporting only one time when the RRC state is changed. In this case, upon receiving the request or reporting period information indicating "one time", the (R)AN performs reporting only one time when the RRC state is changed. The request or reporting period information indicating "continuous" may mean that the (R)AN should reporting whenever the RRC state is changed. Upon receiving the request or reporting period information indicating "continuous", the (R)AN may report the RRC state whenever the RRC state is changed. If the RRC state reporting control information includes "period (time)", the (R)AN should report the RRC state to the AMF during the corresponding time. RRC state reporting control value(s) received using the RRC state reporting control message are stored in the (R)AN (as a context of the UE). Thereafter, even when a serving (R)AN is changed in the CM_CONNECTED state, the RRC state reporting control value(s) are maintained even in the changed serving (R)AN. However, if an N2 connection is released, that is, if a CM state of the UE enters a CM_IDLE state, the RRC state reporting control value(s) may be deleted from the (R)AN node together with other UE contexts.

A request information IE in addition to the request type and the reporting period may be included in the RRC state reporting control message. The request information IE may indicate additional reporting value(s) to the (R)AN. The additional reporting value(s) may include, for example, a UE location value and/or a coverage enhancement (CE) value. If the "UE location" is included in the RRC state reporting control message as the reporting values, the (R)AN may report an identifier of a cell to which the UE belongs and an identifier of a tracking area to which the UE belongs to the AMF together with the RRC state when the RRC state of the UE is changed. If the "CE value" is included in the RRC state reporting control message as the reporting values, the (R)AN may transmit a CE (or enhanced coverage) value applied to the UE to the AMF together with the RRC state.

The UE location and/or the CE value may be included in the RRC state reporting control message as an IE for RRC state reporting control so that whether reporting/non-reporting may be controlled. Alternatively, the UE location and/or the CE value may always be included in the RRC state reporting control message when the (R)AN reports the RRC state.

Referring to FIG. 10, if the AMF allows the (R)AN to perform RRC state reporting for the UE (using the RRC state reporting control message) (S1000), the (R)AN may perform RRC state reporting to the AMF. For example, the (R)AN may perform reporting on whether the RRC state of the UE is an RRC-ACTIVE state or an RRC_INACTIVE state to the AMF (according to the RRC state reporting control message). Alternatively, the (R)AN may perform reporting on whether the RRC state of the UE is an RRC_CONNECTED state or an RRC_INACTIVE state to the AMF (according to the RRC state reporting control message).

Upon receiving the request type indicating "direct reporting" through the RRC state reporting control procedure, the (R)AN performs RRC state reporting indicating a current RRC state of the UE, i.e., indicating whether an RRC connection exists between the UE and the (R)AN. If the request type indicates "continuous", the (R)AN performs reporting whenever the RRC state of the UE is changed. If the RRC state reporting control message includes a period value, the (R)AN may perform reporting whenever the RRC state of the UE is changed during the corresponding period. While the (R)AN reports the RRC state according to a value of request/reporting information, the (R)AN may include information about a cell in which the UE is located and a CE value in addition to the RRC state. Herein, the CE value indicates CE information which should be considered when the AMF transmits CN-based paging to the UE.

Figure 11:
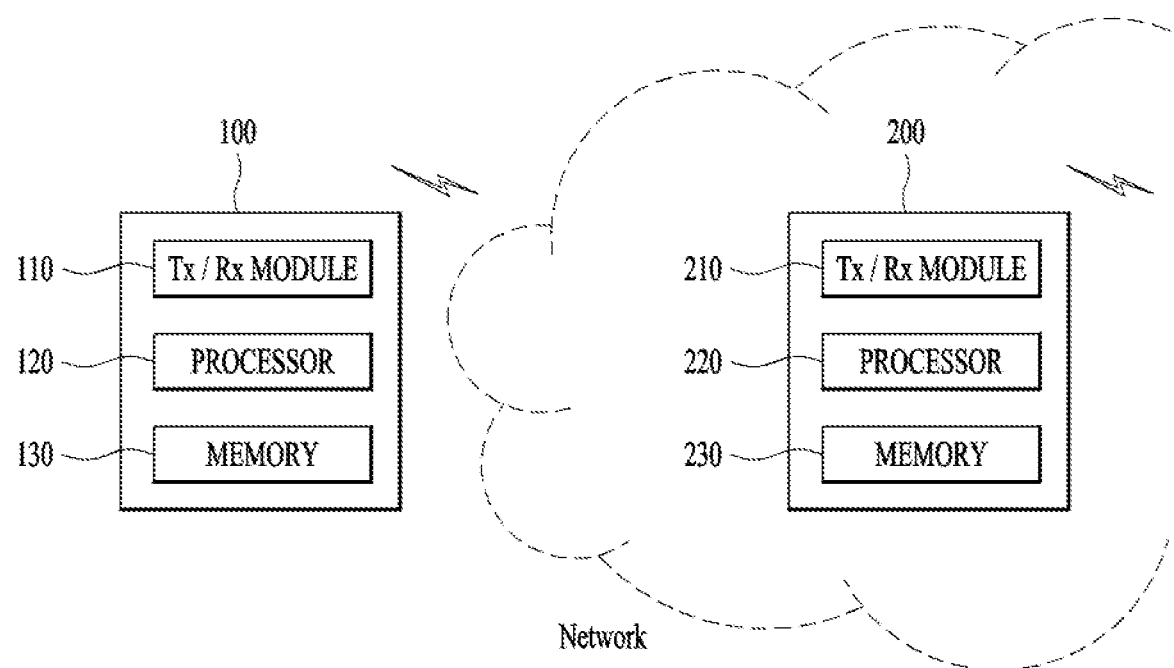
FIG. 11 illustrates a node device according to an embodiment of the present invention.

FIG. 11 illustrates configuration of a UE and a network node according to a preferred embodiment of the present invention.

The UE 100 according to the present invention may include a transmitting/receiving (Tx/Rx) module 110, a processor 120, and a memory 130. The Tx/Rx module 110 of the UE 100 may be referred to as a radio frequency (RF) unit. The Tx/Rx module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the Tx/Rx module 110. The memory 130 may store the calculated and processed information for a predetermined time, and may be replaced by another constituent such as a buffer (not shown).

The network node 200 according to the present invention may include a transmitting/receiving (Tx/Rx) module 210, a processor 220 and a memory 230. If the Tx/Rx module communicates with a UE 100, the Tx/Rx module 210 may be referred to as an RF unit or a transceiver. The Tx/Rx module 210 may be configured to transmit and receive various signals, data and information to and from an external device. The network node 200 may be connected to an external device by wire and/or wirelessly. The Tx/Rx module 210 may be embodied to be divided into a transmitter and a receiver. The processor 220 may control overall operation of the network node 200, and be configured to calculate and process information for the network node 200 to transmit and receive to and from the external device. In addition, the processor 220 may be configured to perform the proposed operations of the network node. According to the proposal of the present invention, the processor 220 may control the Tx/Rx module 210 to transmit data or a message to a UE or another network node. The memory 230 may store the calculated and processed information for a predetermined time, and may be replaced by another constituent such as a buffer (not shown). In an access network, the network node 200 may be an eNB or a gNB. In a core network, the network nodes 200 may be an AMF device with an access and mobility management function.

For configuration of the UE 100 and the network apparatus 200, the details described in various embodiments of the present invention may be independently applied or implemented such that two or more embodiments are simultaneously applied. For simplicity, redundant description is omitted.

In the present invention, the processor of the AMF device controls the Tx/Rx module of the AMF device to transmit an RRC state transition control message for the UE according to the present invention to a RAN node (e.g., eNB or gNB). The RRC state transition control message includes at least one of the above-described RRC state reporting control values. If the Tx/Rx module of the RAN node receives the RRC state transition control message, the RAN node controls the Tx/Rx module thereof to transmit an RRC state reporting message indicating the RRC state of the UE to the AMF device according to value(s) in the RRC state transition control message. The AMF device may control the Tx/Rx module to transmit a message indicating that reporting about change of the RRC state of the UE should be stopped to the RAN node. Upon receiving the message, the processor of the RAN node may stop reporting about the RRC state of the UE.

The present invention may be implemented through various means. For example, the present invention may be implemented by hardware, firmware, software, or a combination thereof.

When implemented by hardware, a method according to the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP based system. Furthermore, the proposed method is applicable to a millimeter wave (mmWave) communication system using an ultrahigh frequency band.

The invention claimed is:

1. A method of receiving, by a network device with an access and mobility management function (AMF), reporting regarding a user equipment, the method comprising:
transmitting, by the network device with the AMF, a request message that requests a base station to perform radio resource control (RRC) state reporting for the user equipment; and
receiving, by the network device from the base station, an RRC state reporting message including information regarding whether the user equipment is in an RRC_CONNECTED state or an RRC_INACTIVE state,
wherein the RRC state reporting message includes (i) an identifier of a tracking area to which the user equipment belongs and (ii) an identifier of a cell to which the user equipment belongs.

2. The method according to claim 1, wherein the request message is transmitted when the user equipment is in a CM_CONNECTED state.

3. The method according to claim 1, wherein the request message includes information regarding whether the base station should perform the RRC state reporting whenever an RRC state of the user equipment is changed.

4. The method according to claim 1, further comprising:
transmitting a request message that requests the base station to stop the RRC state reporting for the user equipment.

5. A method of transmitting, by a base station to a network device with an access and mobility management function (AMF), reporting regarding a user equipment, the method comprising:
receiving a request message that requests the base station to perform radio resource control (RRC) state reporting for the user equipment; and
transmitting, to the network device with the AMF, an RRC state reporting message including information regarding whether the user equipment is in an RRC_CONNECTED state or an RRC_INACTIVE state,
wherein the RRC state reporting message includes (i) an identifier of a tracking area to which the user equipment belongs and (ii) an identifier of a cell to which the user equipment belongs.

6. The method according to claim 5, wherein the request message is received when the user equipment is in a CM_CONNECTED state.

7. The method according to claim 5, wherein the request message includes information regarding whether the base station should perform the RRC state reporting whenever an RRC state of the user equipment is changed.

8. The method according to claim 5, further comprising:
receiving a request message that requests the base station to stop the RRC state reporting for the user equipment.

9. A network device with an access and mobility management function (AMF), the network device configured to receive reporting regarding a user equipment, the network device comprising,
a transceiver, and
a processor configured to control the transceiver, the processor configured to:
control the transceiver to transmit a request message that requests a base station to perform radio resource control (RRC) state reporting for the user equipment; and
control the transceiver to receive, from the base station, an RRC state reporting message including information regarding whether the user equipment is in an RRC_CONNECTED state or an RRC_INACTIVE state,
wherein the RRC state reporting message includes (i) an identifier of a tracking area to which the user equipment belongs and (ii) an identifier of a cell to which the user equipment belongs.

10. The network device according to claim 9, wherein the request message is transmitted when the user equipment is in a CM_CONNECTED state.

11. The network device according to claim 9, wherein the request message includes information regarding whether the base station should perform the RRC state reporting whenever an RRC state of the user equipment is changed.

12. The network device according to claim 9, wherein the processor is further configured to control the transceiver to further transmit a request message that requests the base station to stop the RRC state reporting for the user equipment.

13. A base station configured to transmit, to a network device with an access and mobility management function (AMF), reporting regarding a user equipment, the base station comprising,
a transceiver, and
a processor configured to control the transceiver, the processor configured to:
control the transceiver to receive a request message that requests the base station to perform radio resource control (RRC) state reporting for the user equipment; and
control the transceiver to transmit, to the network device with the AMF, an RRC state reporting message including information regarding whether the user equipment is in an RRC_CONNECTED state or an RRC_INACTIVE state,
wherein the RRC state reporting message includes (i) an identifier of a tracking area to which the user equipment belongs and (ii) an identifier of a cell to which the user equipment belongs.

14. The base station according to claim 13, wherein the request message is received when the user equipment is in a CM_CONNECTED state.

15. The base station according to claim 13, wherein the request message includes information regarding whether the base station should perform the RRC state reporting whenever an RRC state of the user equipment is changed.

16. The base station according to claim 13, wherein the processor is configured to control the transceiver to further receive a request message that requests the base station to stop the RRC state reporting for the user equipment.

* * * * *